United States Patent [19]
Krieter et al.

[11] Patent Number: 5,510,778
[45] Date of Patent: Apr. 23, 1996

[54] PAGING RECEIVER SYSTEM FOR RECEIVING A PAGING COMMUNICATION SIGNAL

[76] Inventors: Marcus A. Krieter, 2760 Kelvin, Apt. 3321, Irvine, Calif. 92715; Steven F. Meadows, 2537 Madison, Long Beach, Calif. 90810

[21] Appl. No.: 222,293

[22] Filed: Apr. 1, 1994

[51] Int. Cl.$^6$ .................................................. G08B 5/22
[52] U.S. Cl. ................... 340/825.44; 364/705.05
[58] Field of Search ............... 340/825.44; 379/59; 455/38.1; 364/705.05

[56] References Cited

U.S. PATENT DOCUMENTS

| | | | |
|---|---|---|---|
| 4,750,036 | 5/1988 | Martinez | 348/12 |
| 4,972,457 | 11/1990 | O'Sullivan | 379/59 |
| 5,043,721 | 8/1991 | May | 340/825.44 |
| 5,047,764 | 9/1991 | Andros et al. | 340/825.44 |
| 5,054,052 | 10/1991 | Nonami | 340/825.44 |
| 5,121,115 | 6/1992 | Andros et al. | 340/825.44 |
| 5,221,838 | 6/1993 | Gutman et al. | 340/825.44 |
| 5,262,769 | 11/1993 | Holmes | 340/825.44 |
| 5,361,061 | 11/1994 | Mays et al. | 340/825.44 |
| 5,365,227 | 11/1994 | Cannon et al. | 340/825.44 |
| 5,387,904 | 2/1995 | Takada | 340/825.44 |

*Primary Examiner*—Donald J. Yusko
*Assistant Examiner*—Edward Merz
*Attorney, Agent, or Firm*—Patterson & Keough

[57] ABSTRACT

A paging receiver system is provided that can be integrated as one function of a multi-function electronic card device adapted for insertion into a portable computing device. The paging receiver system preferably includes a frequency agile receiver for receiving paging signals, a driver-less interface for communicating the received paging signals to the computing device and a platform-transparent memory for storing the received paging signals. The frequency agile receiver includes a frequency synthesizer for generating a user selectable down conversion frequency that is combined by a mixer to produce a received paging signal at a predetermined intermediate frequency. The driver-less interface multiplexes the received paging signal with the output of a data modem such that the computing device requires only a driver interface for the data modem in order to receive both modem data and paging information. The platform-transparent memory stores paging information received from the computing device in a format that is determined by the platform of the particular computing device into which the electronic card device is inserted. A paging receiver caddy is also provided which can receive the electronic card device when not inserted into the portable computing device such that the electronic card device can continue to receive paging information.

14 Claims, 8 Drawing Sheets

4
PAGING RECEIVER SYSTEM FOR RECEIVING A PAGING COMMUNICATION SIGNAL

FIELD OF THE INVENTION

The present invention relates generally to communication devices. More particularly, the present invention relates to an improved architecture for a paging receiver system.

BACKGROUND OF THE INVENTION

Both portable computing devices and pagers are well known. It is also known to combine the functionality of a pager as part of a portable computer. One such combination of a portable computing device and a pager is disclosed by May in U.S. Pat. No. 5,043,721.

While the combination of a portable computing device and a pager as shown in the May patent solves the problem of having to carry separate devices for paging and for portable computing, there are several problems with the way in which the paging functionality of the May patent has been integrated as part of the portable computing device.

First, a user must utilize different insert cards for different types of paging systems in the May patent because different paging systems operate over different radio frequencies. This can be problematic if, for example, a user is a registered user of two different paging systems or a user is traveling out of one paging region and into a different paging region where the operating radio frequency of the particular paging system changes.

Second, the operating system of the portable computer in the May patent must be provided with a unique driver program for each different insert card for a different paging system because the format in which the paging information is received by the portable computer will change from insert card to insert card.

Finally, the electronic insert card of the May patent will constantly occupy one of the expansion card slots of the portable computer while only occasionally receiving paging information. As a result, the flexibility and capability of the portable computer is significantly decreased. If the portable computer has only a single expansion slot, then the user must risk not receiving paging information in order to make another use of the expansion slot. If the portable computer has two expansion slots, this problem is solved, but the flexibility and overall capability of configuring the expansion slots of the portable computer are now the same as if the portable computer had only a single expansion slot.

While the May patent teaches an advantageous solution to overcoming the problem of having to carry separate devices for paging and for portable computing, the May patent has several disadvantages in the way in which the paging functionality is integrated with the portable computing device. Therefore a need exists for a paging receiver that can be integrated as part of a portable computing device and which overcomes these problems, while at the same time is simple and inexpensive to manufacture.

SUMMARY OF THE INVENTION

The present invention provides a paging receiver system that can be integrated as one function of a multi-function electronic card device adapted for insertion into a portable computing device. The paging receiver system preferably includes a frequency agile receiver for receiving paging signals, a driver-less interface for communicating the received paging signals to the computing device and a platform-transparent memory for storing the received paging signals. The frequency agile receiver includes a frequency synthesizer for generating a user selectable down conversion frequency that is combined by a mixer to produce a received paging signal at a predetermined intermediate frequency. The driver-less interface multiplexes the received paging signal with the output of a data modem such that the computing device requires only a driver interface for the data modem in order to receive both modem data and paging information. The platform-transparent memory stores paging information received from the computing device in a format that is determined by the platform of the particular computing device into which the electronic card device is inserted. A paging receiver caddy is also provided which can receive the electronic card device when not inserted into the portable computing device such that a paging receiver on the electronic card device can continue to receive paging information.

In accordance with a first embodiment of the present invention, a frequency agile paging receiver system for use on an electronic card device adapted for insertion into a computing device includes a frequency synthesizer, a mixer, a decoder, a detector and an interface to an .output port of the electronic card device. The frequency synthesizer generates a down conversion signal at one of a plurality of user selectable frequencies. The mixer combines the down conversion signal with a paging signal received from over a radio communication channel to produce a received paging signal at a predetermined intermediate frequency. The decoder decodes the received paging signal at the predetermined intermediate frequency into a base band paging signal. The detector detects paging information from the base band paging signal and the interface presents the paging information to the computing device at the output port.

In accordance with a second embodiment of the present invention, a paging receiver system for use in a multi-function electronic card device adapted for insertion into a computing device includes a data modem, a paging receiver and a switch. The data modem communicates modem data between a first computing device and a second computing device over a first communication channel. The paging receiver is operatively coupled to the data modem and receives paging information over a second communication channel that is a radio frequency communication channel. The switch is operatively coupled to the data modem, to the paging receiver, and to an interface port on the electronic card device to the first computing device, and selectably provides modem data from the data modem or paging information from the paging receiver to the interface port based upon control signals between the data modem and the paging receiver. As a result, the first computing device requires only a driver interface for the data modem in order to receive both modem data and paging information.

In accordance with a third embodiment of the present invention, a paging receiver system for use in a multi-function electronic card device adapted for insertion into a computing device includes both a paging receiver and a memory on the card device. The paging receiver on the card device receives paging information over a radio frequency communication channel and presents the paging information to the computing device in a first data format, the first data format being determined by a native paging format of the paging information. The memory on the card device receives the paging information from the computing device in a second data format and storing the paging information in the second data format, the second data format being determined by and compatible with a native file format of an operating system program executing on the computing device.

DETAILED DESCRIPTION OF THE PREFERRED EMBODIMENT

Figure 1:
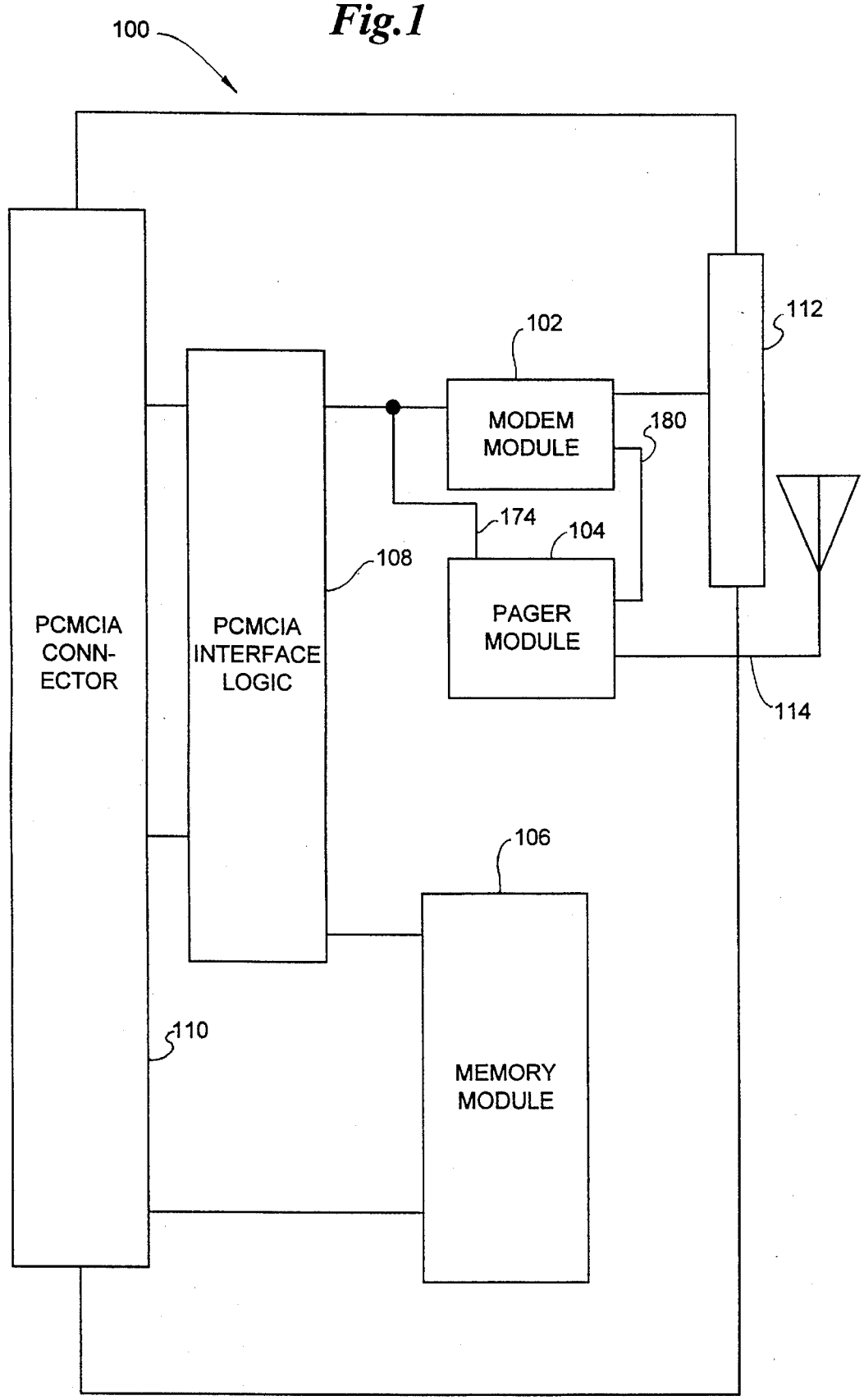
FIG. 1 is a block diagram of a preferred embodiment of a paging receiver system incorporated on a multi-function electronic card device in accordance with the present invention.

The preferred embodiment of the present invention can be summarized in reference to FIG. 1 as a frequency agile communication device 104 or paging receiver system 100 for receiving a paging signal that can interface the received paging information to a computing device through the same interface that is used by a data modem 102 connected to the computing device. The communication device 100 can be integrated into another electronic device or configured as an external peripheral for another electronic device. For example, the communication device 100 may be configured in one of several forms including: a Personal Computer Memory Card International Association (PCMCIA) card, a personal data assistant, a radiotelephone, a notebook computer, or any other general computing machine. It will be appreciated by those skilled in the art that this list of electronic devices is made by example only and that the present invention may be configured in another form, while maintaining the same or similar features and functions, without departing from the scope and spirit of the present invention. In the preferred embodiment, the paging receiver system 100 preferably is configured for use on an electronic card device (e.g., a PCMCIA card) that is adapted for insertion into a computing device.

The communication device 104 includes a frequency synthesizer mechanism 164, 162 which generates a down conversion signal at one of a plurality of user selectable frequencies. The frequency synthesizer mechanism 164, 162 preferably consists of a frequency synthesizer 164 which provides a control signal to a voltage controlled oscillator 164 based upon a user input. The user input is used to configure the communication device 104 for use in a variety of different communication systems. Andros et al. in U.S. Pat. Nos. 5,047,764 and 5,121,115 describe the operation of a typical paging communication system with which the present invention might be utilized. In the preferred embodiment, the user input may indicate that communication device 104 is to operate in a first or a second paging system (e.g., a first or a second frequency band) and/or indicate that the communication device 104 is to receive the paging communication according to the GSC (Golay Standard Code) or POCSAG (Post Office Code Standard Authorization Group) paging signal protocols. This user input capability allows a single paging receiver system 100 to be built which performs a certain type of function such as receiving paging communication signal regardless of the geographic region that the paging receiver system 100 is being operated.

In contrast, the paging accessory as disclosed by May in U.S. Pat. No. 5,043,721 is designed to operate in only a single frequency band and only receive one type of paging signal protocol. Therefore, if a user wanted to receive a paging signal from two different paging systems, then the user would have to install two different paging accessories to receive both paging signals. The preferred embodiment obviates the need for two paging accessories by providing a signal communication device 100 which is capable of being programmed by a user to receive a paging signal in two or more paging systems.

The paging accessory by May is readily understood by those skilled in the art as a logical extension of traditional paging receivers such as those built by Motorola, Inc. The May paging accessory is designed as a simple receiver that would be relatively inexpensive to manufacture. As such, May and other paging receiver manufacturers have no incentive to enhance the functionality of a paging receiver beyond these traditional bounds.

Holmes in U.S. Pat. No. 5,262,769 described one possible enhancement to a paging receiver would be to provide a programmable scanning pager receiver. The programmable scanning pager receiver, as described by Holmes, only scans a pre-programmed set of frequencies out of a larger set of generally available paging frequencies to reduce power consumption in the paging receiver. This pre-programmed set of frequencies are stored into a memory in the paging receiver from an external device.

In contrast, the present invention recognizes the need for even greater functionality, expanded capabilities, and a need to integrate devices performing various functions into a single device. Therefore, the preferred embodiment of the present invention includes a frequency synthesizer 164. This frequency synthesizer 164, unlike the tuning circuit used by Holmes, is not used for scanning frequencies, but rather is used for selecting different frequency bands or carriers (e.g., between entirely different paging systems, or even between different type of radio communication signals).

In addition to the frequency synthesizer mechanism 164, 162, the communication device includes a mixer 160 which combines the down conversion signal from the frequency synthesizer mechanism 164, 162 with a paging signal received from over a radio communication channel via antenna 114 to produce a received paging signal at a predetermined intermediate frequency. This received paging signal at the predetermined intermediate frequency is subsequently down converted by a decoder 172 into a base band paging signal. Finally, a detector 166 detects paging information from the base band paging signal according to either the POCSAG or GSC protocol.

As will be appreciated by those skilled in the art, the preferred embodiment communication device may potentially be used in battery powered mobile computing devices. For example, Nonami in U.S. Pat. No. 5,054,052 discloses a mobile telephone device that operates in a low power consumption mode. In the low power consumption mode taught by Nonami, transceiver channels components are powered down or shut off until a paging signal is received on a separate paging circuit. Like Nonami, the paging receiver system 100 of the present invention is preferably designed to optimize battery power consumption. In the preferred embodiment, this optimization includes only generating the down conversion signal with the frequency synthesizer 164 (i.e., powering up the frequency synthesizer) when attempting to receive a paging signal. In contrast, Nonami does not power down or shut off the separate paging receiver at any time. In this way, the preferred embodiment of the present invention utilizes the frequency synthesizer 164 to both extend the versatility of the device, as well as decrease the overall power consumption of the device 100.

The alternative preferred embodiment of the present invention can be summarized in reference to FIG. 1 as a multi-function electronic card device 100 adapted for insertion into a computing device including a data modem 102, transceiver 104, and switch 178. The electronic card device 100 preferably is a Personal Computer Memory Card International Association (PCMCIA) type II card in which a paging receiver is one function of a plurality of functions performed by the PCMCIA card. As will be appreciated by those skilled in the art several other types of electronic cards could be developed in accordance with the present invention without departing from the scope and spirit of the present invention. The data modem 102 communicates modem data between a first computing device and a second computing device over a first communication channel. The transceiver 104 is operatively coupled to the data modem 102 preferably through an electrical connector or the like such that the transceiver 104 can communicate information other than modem data over a second communication channel. In addition, the switch 178 is also operatively coupled to the data modem 102, the transceiver 104, and an interface port 110 via logic 108 on the electronic card device 100 to the first computing device preferably by electrical connectors or the like. The switch 178 selectably provides modem data from the data modem 102 or other information from the transceiver 104 to the interface port 110 based upon control signals 180 between the data modem 102 and the transceiver 104, such that the first computing device requires only a driver interface for the data modem 102 in order to receive both modem data from the first communication channel and other information from the second communication channel.

In the alternative preferred embodiment, the data modem 102 includes a microprocessor. This microprocessor incorporates the functions of the switch 178 and operates as the switch 178 in response to a command signal received from the transceiver 104. Also, the data modem 102 includes apparati and/or microprocessor software for communicating facsimile information between the first and second computing devices.

Although the preferred transceiver 104 of the present invention is preferably a paging receiver in accordance with the following description, it will be appreciated by those skilled in the art the concepts and teachings of the present invention may be readily applied to other transceiver devices. For example, the transceiver could alternatively be cellular data packet device (CDPD) unit, a celluar circuit switch data (CCSD) unit, a short message service receiver, a global positioning satellite (GPS) receiver, a data network interface card (e.g., for ethernet or Token ring), a radiotelephone or similar voice signal receiver, or a video signal receiver. Similarly, while the preferred communication channel over which the information other than modem data information is preferably a radio frequency paging channel, it will be appreciated by those skilled in the art that the concepts and teaching of the present invention might be readily applied to other types of communication channels including both public and private radio and hard-wired communication systems, and local and wide area networks.

Referring now more particularly to the preferred embodiment paging receiver system 100 which is shown FIG. 1, the paging receiver system 100 can be integrated as one function of a multi-function electronic card device adapted for insertion into a portable computing device (not shown). The paging receiver system 100 preferably includes a frequency agile receiver for receiving paging signals (i.e., pager module 104 and antenna 114), a driverless interface for communicating the received paging signals to the computing device (i.e., a combination of modem module 102, pager module 104, and PCMCIA interface logic 108), and a platform-transparent memory module 106 for storing the received paging signals. In addition, the paging receiver system 100 also includes an external connector 110 for interfacing the system through on board PCMCIA interface logic 108 with a PCMCIA slot in the computing device.

Figure 2:
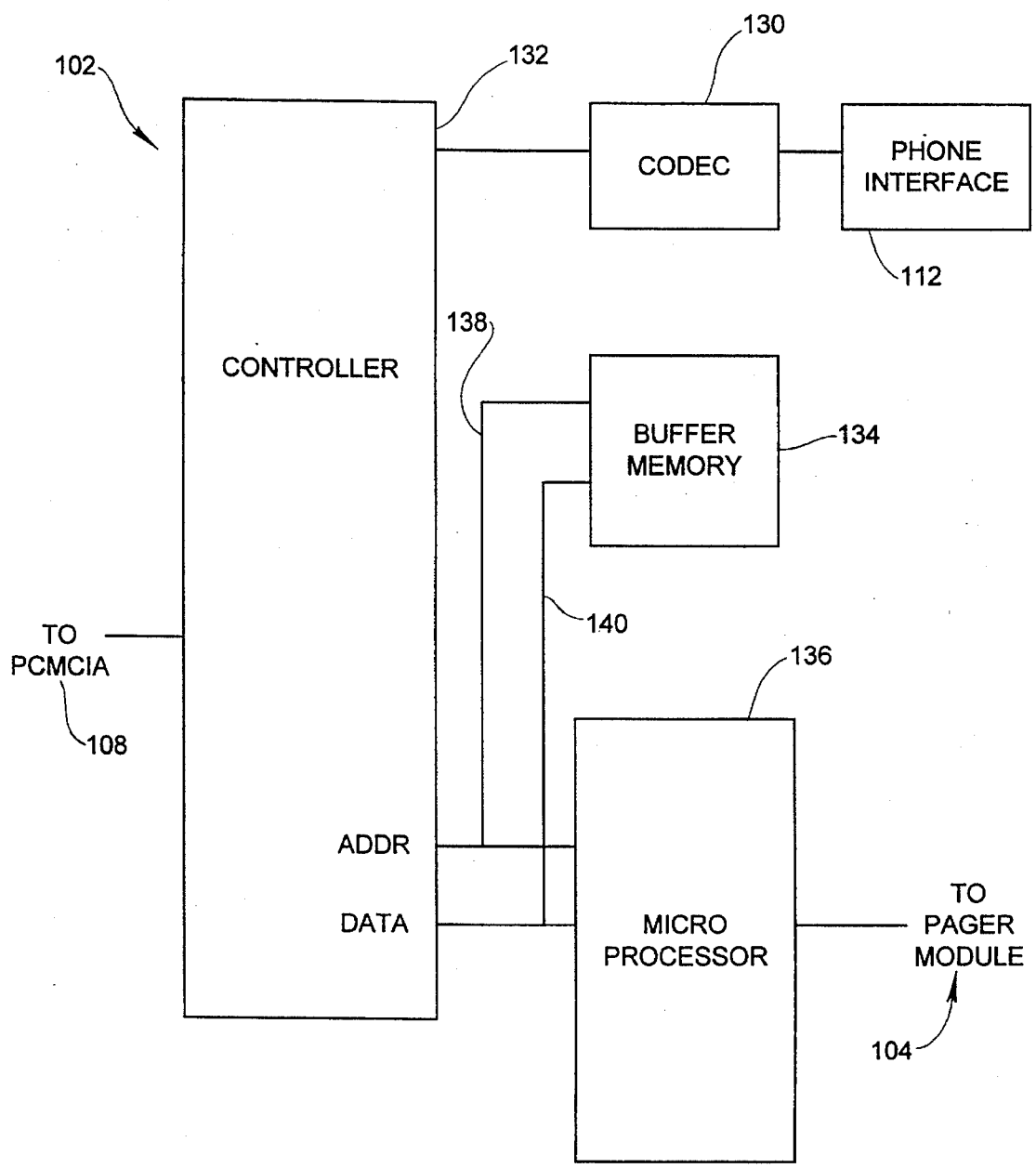
FIG. 2 is a block diagram of a preferred embodiment of a data modem module in accordance with the present invention for use in the device shown in FIG. 1.

The paging receiver system 100 also includes a modem module 102, as shown in FIG. 2, which can send and receive data or facsimile information. In the preferred embodiment, the modem module consists of the CLMD1414XX chip set available from Cirrus Logic, Inc., Milpitas, Calif. The modem module 102 connects to a second computing device through connector 112 other than the first computing device which is connected through PCMCIA connector 110. Connector 112 may be an telephone interface such as an RJ-11 jack, a serial port such as an RS-232 9 or 25 pin port, an ethernet coaxial cable or twisted pair adapter, or any other external device connector. The chip set operates substantially as described in readily available data sheets from Cirrus. The chip set at a minimum includes a coder/decoder (codec) 130 which converts between an analog signal for the telephone interface 112 and a digital signal which a controller 132 can manipulate. Controller 132 performs the low level data traffic control of digital data coming from the PCMCIA interface logic 108, telephone phone interface 112, and pager module 104. Controller 132 is configured to accept high level control signals 138 and 140 from a microprocessor 136. Microprocessor 136 in conjunction with buffer memory 134 are programmed to communicate modem data and facsimile information. In the preferred embodiment, the modem module 102 microprocessor 136 is connected to a pager module 104.

Figure 3:
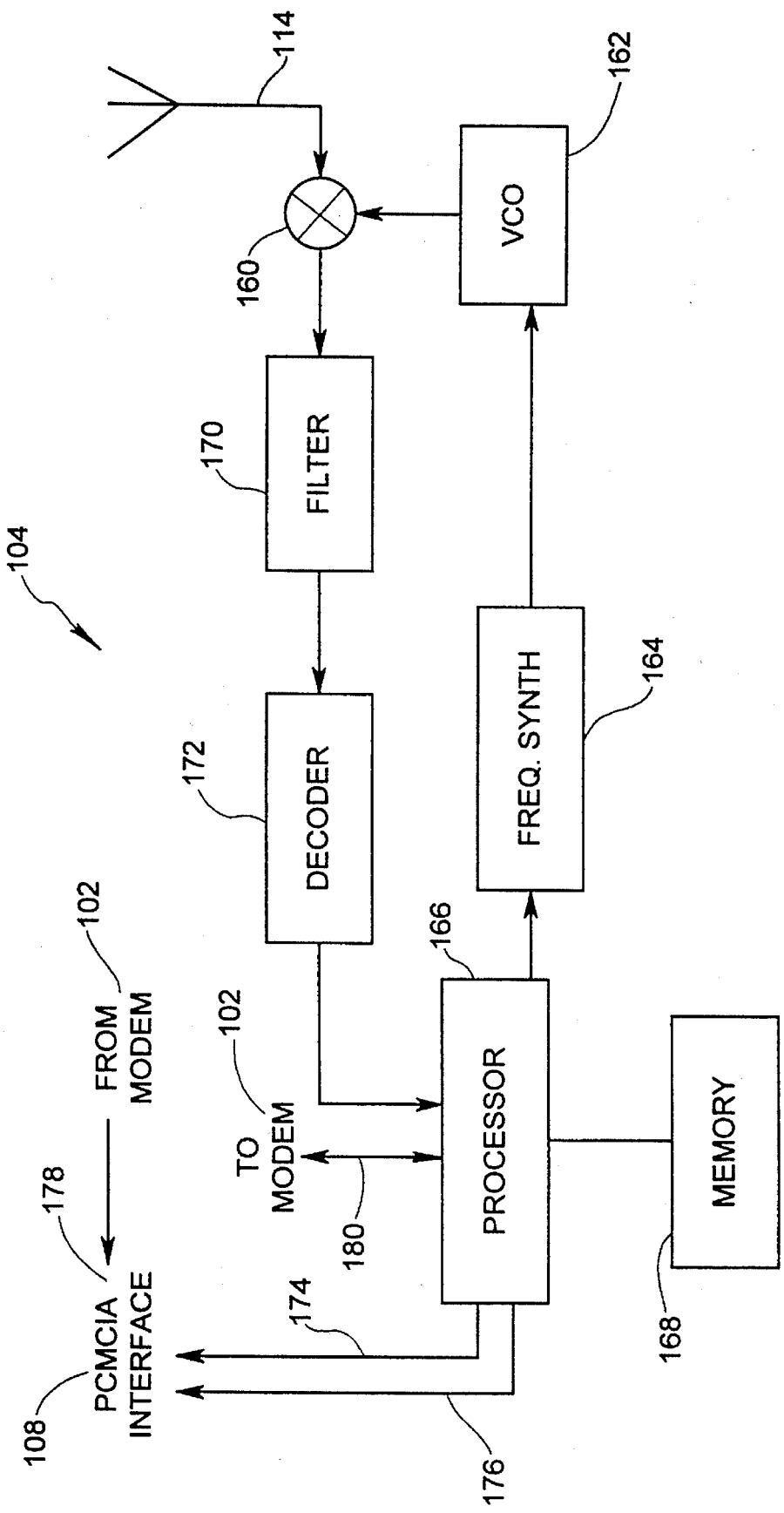
FIG. 3 is a block diagram of a preferred embodiment of a paging signal receiver module in accordance with the present invention for use in the device shown in FIG. 1.

Turning now to FIG. 3, the frequency agile paging receiver module 104 preferably includes a frequency synthesizer 164 for generating a user selectable down conversion frequency in conjunction with a voltage controlled oscillator (VCO) 162 that is combined by a mixer 160 with a signal received by an antenna 114 from a radio frequency band (e.g., somewhere in the 900 Megahertz band) to produce a received signal at a predetermined intermediate frequency (IF) (e.g., centered precisely at a carrier frequency of 300 Megahertz). This IF paging signal optionally may be bandpass filtered by filter 170 to eliminate spurious noise in the received IF signal. Subsequently, the filtered IF signal is input to a decoder 172 which down converts the IF signal (e.g., at 300 Megahertz) to a baseband signal (i.e., data bit stream) which can be operated on by a paging microprocessor 166. Processor 166 caches paging information to memory 168 during receiving operations so that the received data bit stream can be interpreted as a POCSAG or GSC paging signal. In addition, the processor 166 preferably is programmed to perform error detection and/or correction on the data bit stream (e.g., through a cyclically redundant code (CRC) or the like). After the processor 166 completes the receiving operation and caches the paging signal in buffer memory 168, processor 166 preferably passes the paging signal to a computing device attached to the PCMCIA connector 110 through PCMCIA interface 108. This is preferably accomplished through modem module 102 and a switch 178. These three elements form a driver-less interface which multiplexes the received paging signal with the output of a data modem module 102 such that the computing device requires only a driver interface for the data modem in order to receive both modem data and paging information. This is accomplished by processor 166 controlling switch 178 with a control line 176 which effectively multiplexes data from the modem module 102 and data 174 from the paging module 104. The processor 166 negotiates control of this switch 178 with the modem module 102 on a bi-directional control link 180.

Figure 4:
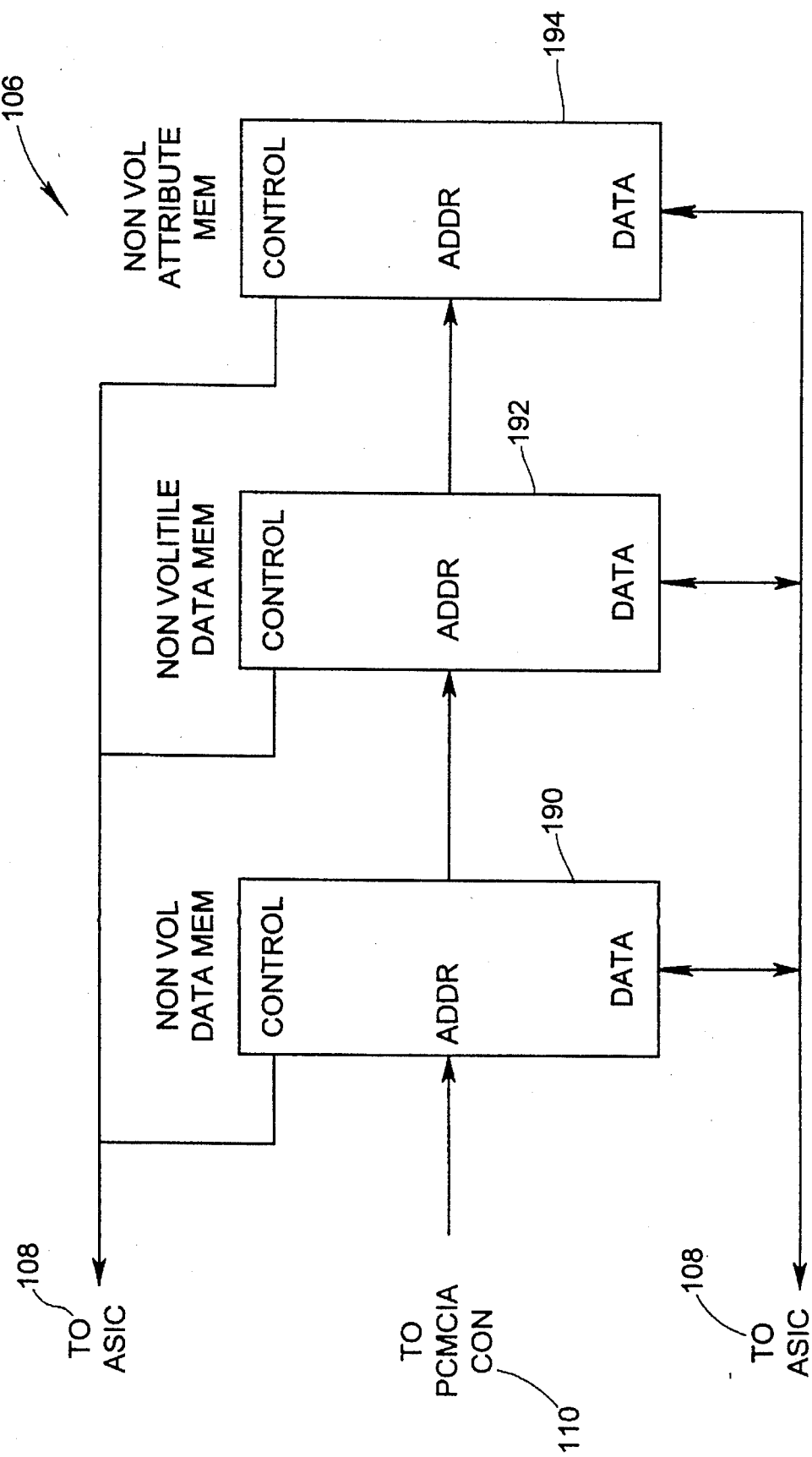
FIG. 4 is a block diagram of a preferred embodiment of a memory module in accordance with the present invention for use in the device shown in FIG. 1.

Referring now to FIG. 4, memory module 106 preferably includes two or more non-volatile, flash memory chips 190 and 192 which are used for storing data memory and a third non-volatile, flash memory chips 194 which is used to store attribute memory for the paging receiver system 100. Each chip 190, 192 and 194 is connected to address lines in PCMCIA connector 110 and to data and control lines from PCMCIA interface logic 108 in a manner well known by persons skilled in the art of implementing computer memory systems. Although the hardware connections for accessing memory module 106 will be fixed by a particular memory access design, memory module 106 will be capable of storing data in a variety of data formats, depending upon how memory module 106 is formatted by the computing device in which it is inserted. In this way, memory module 106 is similar to an unformatted floppy disk. While the unformatted floppy disk may be used in any number of different computer systems, once the floppy disk is formatted for storing information according to a file structure determined by the operating system program (e.g., DOS, Macintosh® or Unix®), the information on the floppy disk is accessible only if the computing device knows and utilized the proper data structure to access the stored files. Thus, once the electronic card device is inserted into a computing device, that computing device will most likely format memory module 106 to store information in a data format used by the operating system program of that particular computing device.

Memory module 106 implements a platform-transparent memory for storing paging information by storing paging information as received from the computing device in a format that is determined by the platform of the particular computing device into which the electronic card device is inserted, rather than attempting to store the paging information directly from pager module 104. In this way, the platform-transparent memory feature of the present invention can take advantage of the inherent translation of data formats which will occur when the paging information received by pager module 104 is routed through the computing device before being stored in memory module 106. As with the arrangement for the shared interface of the modem module 102 and pager module 104 described in FIG. 2, the platform-transparent memory feature of the present invention allows paging receiver system 100 to be utilized in a seamless and more flexible manner than, for example, the paging receiver described in the May patent because neither the paging receiver system, nor the computing device to which it is connected, must know exactly the file structure and data formats used to store information in memory.

Figure 5:
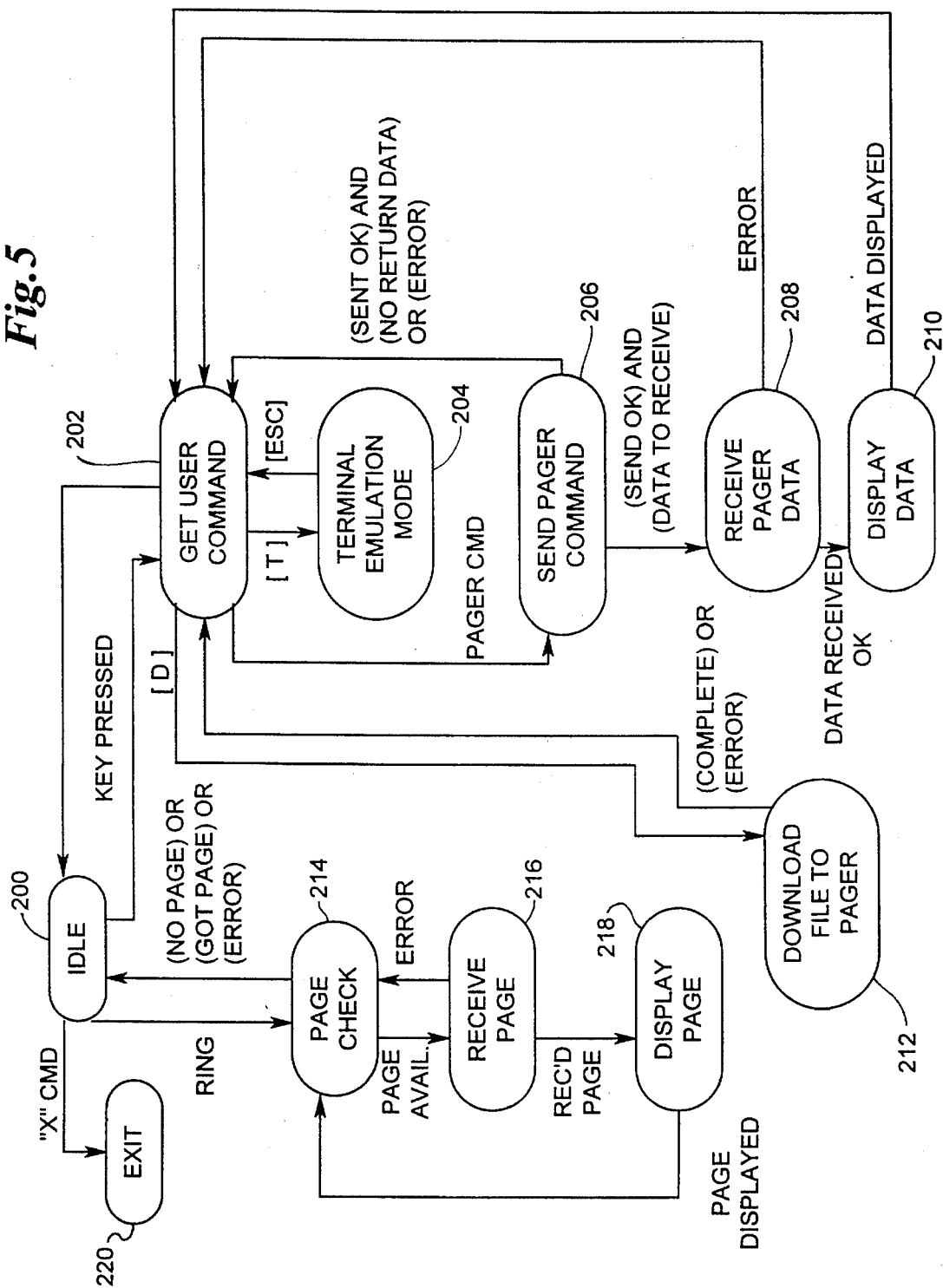
FIGS. 5, 6 and 7 are state diagrams of preferred embodiment of the operations of the paging receiver system shown in FIGS. 1, 2, 3, and 4.
Figure 6:
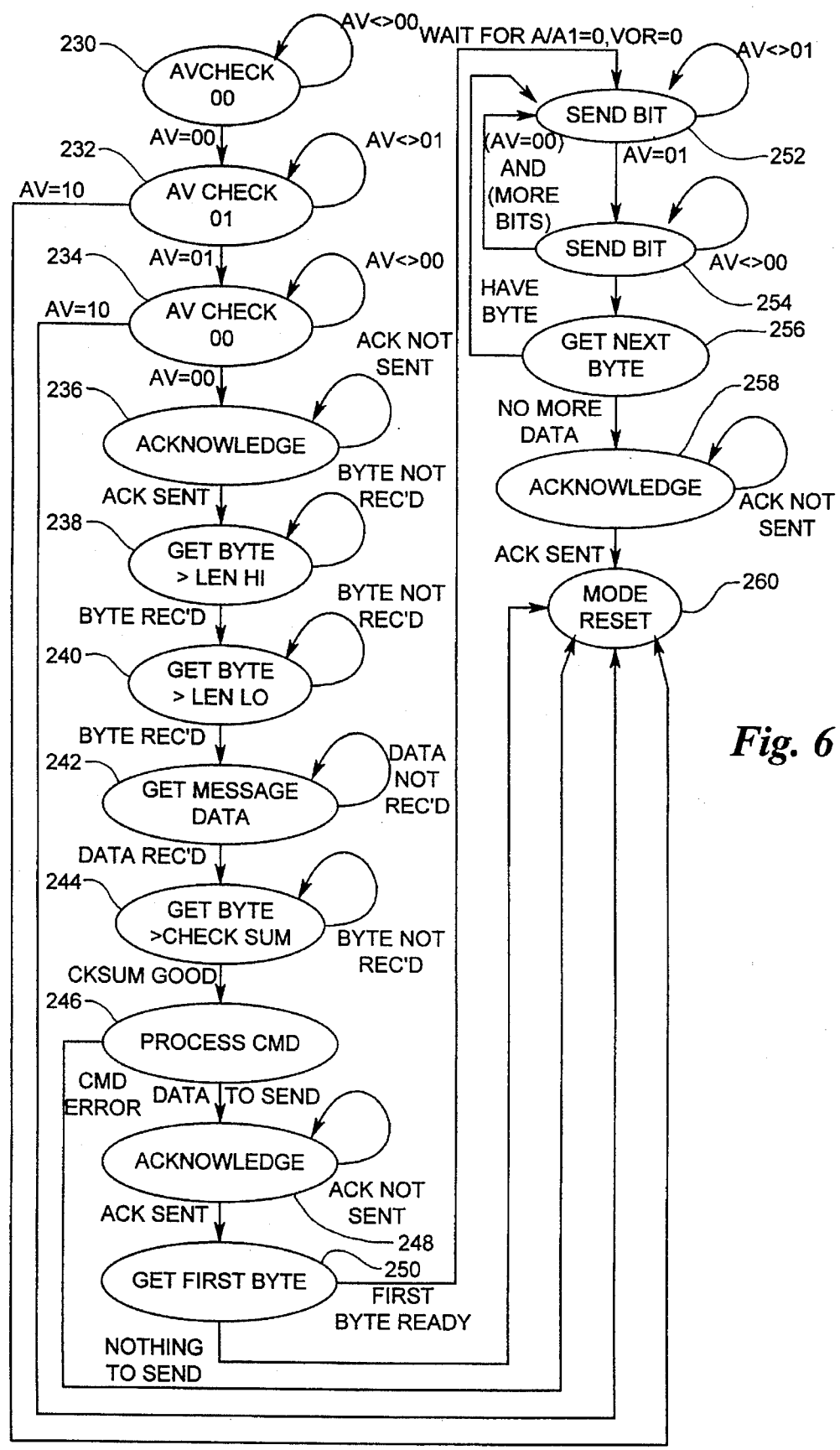
Figure 7:
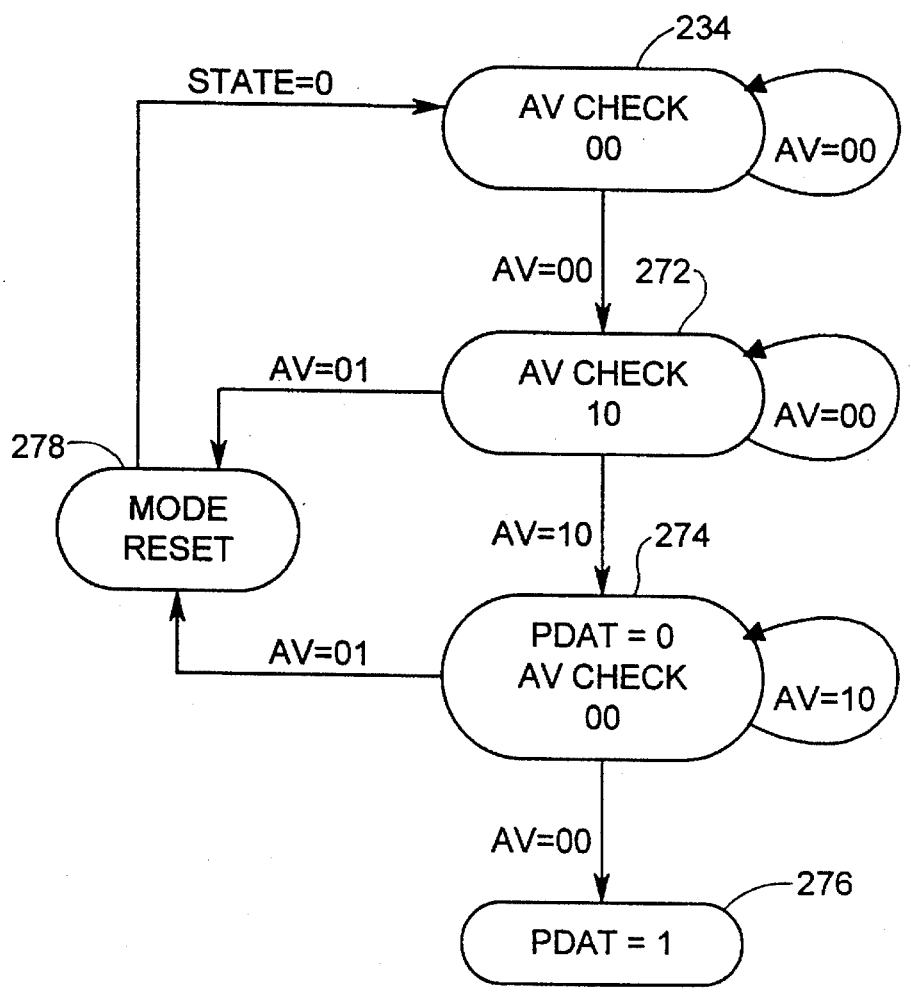
Figure 8:
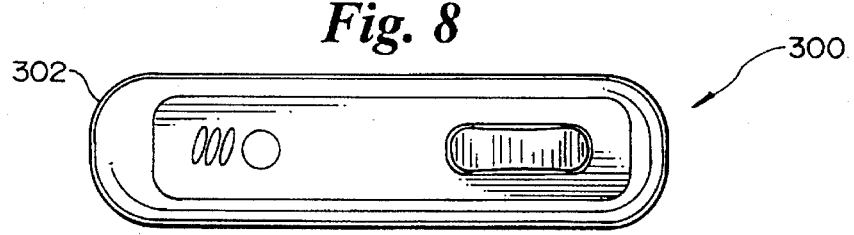
FIGS. 8, 9, 10 and 11 are various plan views of a caddy for receiving an electronic card device incorporating the paging receiver system of the present invention.
Figure 9:
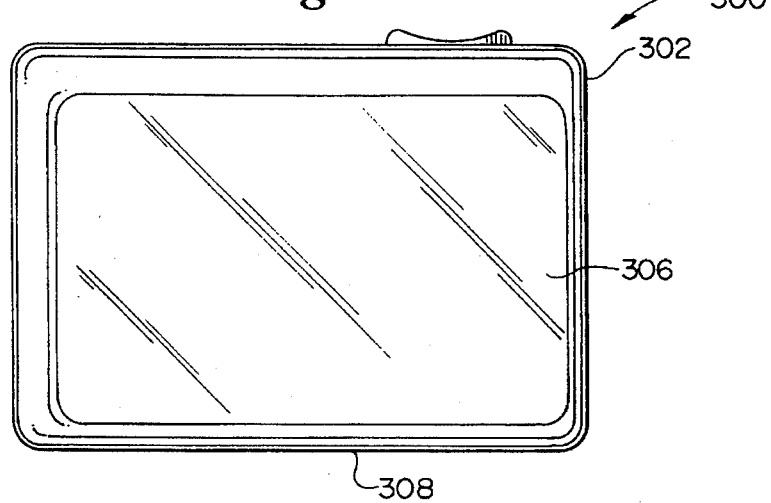
Figure 10:
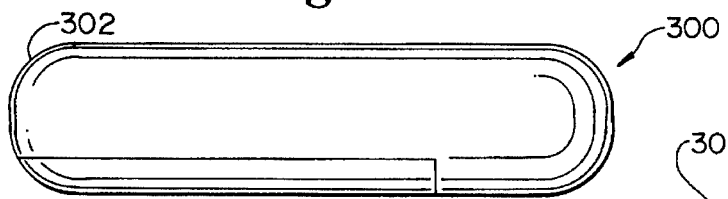
Figure 11:
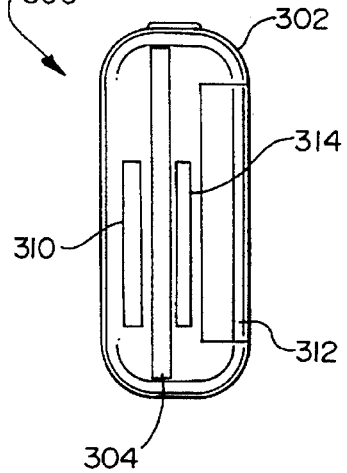

A more complete description of the operation of the paging receiver system 100 is described, and shown FIGS. 5, 6 and 7, in reference to the state diagrams depicting preferred embodiment operations of the communication device shown in FIGS. 1, 2, 3, and 4. Referring now to FIG. 5, a host computing device connected through PCMCIA connector 110 uses software to control the paging communication system 100. This software manipulates the individual modules 102, 104, and 106 by changing the logical state of particular output pins and reading the logical state of other pins on semiconductor chips within the modules. The following example describes a serial operation of communication for the paging receiver 102 through a data output pin D7 in the modem module 104; however as will be appreciated by those skilled in the art parallel communication could be implemented by using more data output pins (e.g., output pins D0–D6) and routing the paging information into the modem module 104 to be relayed out the output pins (D0–D7 under firmware control of the modem module 104, for example, without departing from the scope and spirit of the present invention. It will also be appreciated that the operation and functionality of the communication device of the present invention could also be accomplished by implementing the paging receiver 102 and the modem module 104 as part of a single ASIC chip or chip set.

The host computing device (not shown) has two pins (e.g., A1 and VOL) that it can assert (i.e., change the logical state of) in the modem module 102. Transitions on these two pins A1 and VOL are limited in speed to the rate at which the modem module 102 can toggle them. By convention, if A1 and VOL are both logically high, the communications link is idle. These pins change state due to other operating conditions present in the modem module 102; however, as will be described below care has been taken to seamlessly integrate communications with the paging module 104 into the other operating conditions in the modem module 102. A specific sequence must occur on pins A1 and VOL within a specified amount of time before the communications can be considered alive. The pager module 104 transmits data to the host computing device by setting PDAT pin low which forces mode reads of pin D7 to always be 1, and also causes pins D7 to be undefined when writing to the modem module 102. The pager module 104 will not assert data unless the proper sequences have occurred indicating a valid host computing device-modem communications mode. The pager module 104 only responds when spoken to by the host computing device.

The host computing device paging receiver operation software (hereinafter referred to as "software") begins in an idle state 200. During any point in the idle state 200, the software may be exited 220 with an "X" command. Otherwise, the paging module 104 notifies the host computing device that a page is waiting to be displayed by sending an AT command through the modem module 102 that an off-hook ringing condition exists. This ringing condition is also used by the modem module 102 to receive a fax or data communication from phone interface 112. Therefore, the host computing device must be programmed to send a query command of whether a page exists 214 to the paging receiver module 104 on each instance of a ringing condition. If no page exists, the page has already been received, or an error occurred, then the software returns to the idle state 200. Otherwise, when an page is available for display, the software transitions to state 216 to receive the paging signal information. Once the paging information is received by the host computing device, the paging information is displayed in state 218 and the software is returned to the check for more paging information state 214.

In the instance when a user input (such as a key being pressed) occurs, the software gets the user command 202. If getting the software is complete or an error occurs at this point, the software returns to the idle state 200. If download file to pager is requested, then state 212 is entered until that operation is complete. If a terminal emulation session is requested, then state 204 is entered until that operation is complete. If a send pager command is requested, then state 206 is entered until most of these commands are complete. In the particular instance that the paging command includes a request for the pager to send data, then state 208 is entered. From the receive pager data state 208, if an error occurs, then the software returns to the get user command state 202. Otherwise, if no error occurs during the data reception, then the data is displayed by the host computing device in state 210 and operations continue from the get user command state 202.

Turning now more specifically to the host computing device communications, for the host computing device to send data to the microprocessor 166 in the pager module 104 see Table 1 as shown below and beginning at state diagram element 230 refer to FIG. 6 and associated Acknowledge function 236, 248, and 258 shown in FIG. 7.

TABLE 1

| Element | A | V | PDAT | |
|---|---|---|---|---|
| undefined | X | X | 1 | |
| 230 | 0 | 0 | | |
| 232 | 0 | 1 | | |
| 234 | 0 | 0 | | |
| 272 | 1 | 0 | | |
| 274 | | | 0 | |
| 274 | 0 | 0 | | |
| 276 | | | 1 | Send data bytes |
| 238, 240, 242, 244 | — | — | | |
| 234 | 0 | 0 | | |
| 272 | 1 | 0 | | |
| 274 | | | 0 | Unless an error occurs |
| 274 | 0 | 0 | | |
| 276 | | | 1 | |

If data is being returned from the microprocessor 166, the data is returned as clocked by V pin (i.e., control line 176 to analog switch 178). When V goes from low to high, even bit data (i.e., from modem module 102) is placed on pin D7 to PCMCIA interface 178. When data pin goes from high to low, odd bit data (from paging module 104 data line 174) is placed on pin D7. Since data is transmitted in byte groups, there is always an even number of bits transmitted as shown below beginning at state element 250 of Table 2.

TABLE 2

| Element | A | V | PDAT | |
|---|---|---|---|---|
| 276, 250 | 0 | 0 | 1 | From above |
| 252 | 0 | 1 | | |
| 252 | | | X | Even bit data |
| 254 | 0 | 0 | | |
| 254 | | | X | Odd bit data |
| 256 | | | | repeated for each pair of bits |
| r | n | 1 | 0 | |
| n + 1 | | | 0 | |
| n + 2 | 0 | 0 | | |
| n + 3 | | | 1 | |

When data exchange is completed, host computing device does an acknowledge subroutine 258 and returns AV lines to idle state as shown below in Table 3.

TABLE 3

| Element | A | V | PDAT |
|---|---|---|---|
| 260 | X | X | 1 |
| 260 | 1 | 1 | |

Each data bit is transmitted from host computing device to microprocessor 166 by changing the state of AV lines. To transmit a data bit, AV is set to a value dependent upon its current state as shown below in Table 4.

TABLE 4

| last state | | new state | | |
|---|---|---|---|---|
| A | V | A | V | Defined bit |
| 0 | 0 | 0 | 1 | 0 |
| 0 | 0 | 1 | 0 | 1 |
| 0 | 1 | 0 | 0 | 0 |
| 0 | 1 | 1 | 0 | 1 |
| 1 | 0 | 0 | 0 | 0 |
| 1 | 0 | 0 | 1 | 1 |

The modem transits changes to these bits very slowly. The transition is approximately 15 milliseconds (ms) per change within a nibble. There are approximately 30 ms between nibbles. The microprocessor 166 must wait until change occurs without timing out. The message structure is shown below in Table 5.

TABLE 5

| Byte | Description |
|---|---|
| 0–1 | length of message (including length and c.s.) |
| 2 | command |
| 3→len-1 | message body |
| len | checksum |

Host computing device to microprocessor 166 commands are as shown below in Table 6.

TABLE 6

NULL: Null command that does nothing.

| Byte | Description | |
|---|---|---|
| 0–1 | 4 | |
| 2 | 0 × 00 | |
| 3 | 0 × fc (checksum) | |

FREQ: Sets pager frequency.

| Byte | Description | |
|---|---|---|
| 0–1 | 9 | |
| 2 | 0 × 01 | |
| 3 | 1014 | sub address |
| 4 | 1014 | IPCD, PD |
| 5 | 1014 | MD16, MD17 |
| 6 | 1014 | MD6–MD15 |
| 7 | 1014 | MD0–MD7 |
| 8 | checksum | |

ADD CAP: Adds cap code to pager cap code list.

| Byte | Description |
|---|---|
| 0–1 | 10 |
| 2 | 0 × 02 |
| 3 | data rate (baud rate / 100) |
| 4 | data type |
| 5–7 | cap code |
| 8 | checksum |

Data type is 8 bits.

bits 01 are for function code 00

TABLE 6-continued bits 23 are for function code 01
bits 45 are for function code 10
bits 67 are for function code 11
In each bit position:

00 = numeric
01 = tone only
10 = alpha
11 = reserved
DEL CAP: Deletes cap code from pager cap code list.

| Byte | Description |
| --- | --- |
| 0–1 | 8 |
| 2 | 0 × 03 |
| 3–5 | cap code |
| 6 | checksum |

WRITE FLASH: Writes data sequence to flash memory at specified address.

| Byte | Description |
| --- | --- |
| 0–1 | data size + 6 (6 to 261) |
| 2 | 0 × 04 |
| 3–4 | destination address |
| 5–n | data bytes (0 to 255) |
| n + 1 | checksum |

READ FLASH: Reads data bytes from flash memory at specified address.

| Byte | Description |
| --- | --- |
| 0–1 | 8 |
| 2 | 0 × 05 |
| 3–4 | address |
| 5–6 | number of bytes |
| 7 | checksum |

WRITE XRAM: Writes data sequence to external RAM at specified address.

| Byte | Description |
| --- | --- |
| 0–1 | data size + 6 |
| 2 | 0 × 06 |
| 3–4 | destination address |
| 5–n | data bytes |
| n + 1 | checksum |

READ XRAM: Reads data bytes from external RAM at specified address.

| Byte | Description |
| --- | --- |
| 0–1 | 8 |
| 2 | 0 × 07 |
| 3–4 | address |
| 5–6 | number of data bytes |
| 7 | checksum |

WRITE RAM: Writes data sequence to internal RAM at specified address.

| Byte | Description |
| --- | --- |
| 0–1 | data size + 6 |
| 2 | 0 × 08 |
| 3–4 | destination address |
| 5–n | date bytes |
| n + 1 | checksum |

READ RAM: Reads data bytes from internal RAM at specified address.

| Byte | Description |
| --- | --- |
| 0–1 | 8 |
| 2 | 0 × 09 |
| 3–4 | address |
| 5–6 | data size |
| 7 | checksum |

RQST PAGE: Causes page requested to be sent.

| Byte | Description |
| --- | --- |
| 0–1 | 6 |
| 2 | 0 × 0a |
| 3–4 | page number |
| 5 | checksum |

DELETE PAGE: Deletes specified page.

TABLE 6-continued

| Byte | Description |
| --- | --- |
| 0–1 | 6 |
| 2 | 0 × 0b |
| 3–4 | page number |
| 5 | checksum |

QUERY PAGER: Requests status to be sent.

| Byte | Description |
| --- | --- |
| 0–1 | 4 |
| 1 | 0 × 0c |
| 2 | checksum |

For those host computing device commands that request data to be returned from pager, the following packets are returned as shown in Table 7.

TABLE 7

PAGE: Page data for a specific page number that exists.

| Byte | Description |
| --- | --- |
| 0–1 | 12 + page data length |
| 2 | 0 × 81 |
| 3–4 | address of page |
| 5–6 | page number |
| 7 | identifier data |
| 8–10 | cap code |
| 11–n | page data bytes |
| n + 1 | checksum |

INVALID PAGE: If a non-existent page is read, the following message is returned.

| Byte | Description |
| --- | --- |
| 0–1 | 4 |
| 2 | 0 × ff |
| 3 | 0 × fd |

STATUS: Pager status.

| Byte | Description |
| --- | --- |
| 0–1 | 14 |
| 2 | 0 × 82 |
| 3–4 | number of unread pages |
| 5–6 | number of stored pages |
| 7–8 | remaining space for pages |
| 9 | range indicator |
| 10–11 | page number of oldest unread page |
| 12–13 | page number of oldest stored page |
| 14 | checksum |

READ MEMORY COMMANDS: Read memory commands for reading FLASH, XRAM or RAM are the same except for the command byte.

| Byte | Description |
| --- | --- |
| 0–1 | 3 + length of data |
| 2 | COMMAND<br>0 × 85 = FLASH<br>0 × 87 = XRAM<br>0 × 89 = IRAM |
| 3 | memory data bytes |
| n + 3 | checksum |

Referring now to FIGS. 8, 9, 10, and 11, a paging receiver caddy 300 is also provided for by the present invention. Paging receiver caddy 300 is constructed to receive an electronic card device 100 that is adapted for insertion into a computing device (not shown) when electronic card device 100 is not inserted into the portable computing device. In this way, a user can continue to receive paging information captured by paging receiver system 100, without the requirement of carrying the portable computing device into which paging receiver system 100 would normally be inserted.

Caddy 300 includes a hand-held body 302 which is preferably of a size just larger than electronic card device 100 such that structure of body 302 defines an aperture 304 into which the electronic card device 100 is inserted. A display 306 on a surface 308 of body 302 displays the information received by electronic card device 100. A connector 310 inside aperture 304 makes electrical connection with electronic card device 100 when the electronic card device is inserted into aperture 304.

The components within caddy 300 are preferably kept very simple to minimize the cost of caddy 300 and to extend the useful operating life of the device. At a minimum, caddy 300 includes a battery or power supply 312 contained within body 302 and connected to connector 310 for providing electrical power to electrical card device 100 when inserted into aperture 304. Caddy 300 also includes a controller 314, such as a microcontroller or microprocessor, contained within body 302 and operably connected to connector 310 and display 306 for receiving paging information from electronic card device 100 and for displaying the paging information on display 306. It will be apparent to those skilled in the art that other types of functionality, such as time keeping or storage of frequently called phone numbers, could easily be integrated with the electronic functionality of caddy 300 without departing from the objective of a simple, inexpensive and battery-efficient device.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

We claim:

1. A paging receiver system for use in a multi-function electronic card device adapted for insertion into a computing device, the paging receiver system comprising:

(a) data modem means on the card device for communicating modem data between a first computing device and a second computing device over a first communication channel;

(b) paging receiver means, on the card device and operatively coupled to the data modem means, for receiving paging information over a second communication channel that is a radio frequency communication channel; and (c) switching means, on the card device and operatively coupled to the data modem means, the paging receiver means, and an interface connector on the electronic card device to the first computing device, for selectably providing modem data from the data modem means or paging information from the paging receiver means to the interface connector based upon control signals between the data modem means and the paging receiver means, such that the first computing device requires only a driver interface for the data modem means in order to receive both modem data and paging information.

2. The paging receiver system of claim 1 wherein the data modem means includes a microprocessor and the switching means is incorporated into a function of the microprocessor in response to a command signal received from the paging receiver means.

3. The paging receiver system of claim 1 wherein the data modem means includes means for communicating facsimile information.

4. The paging receiver system of claim 1 further including means for generating a ring signal by the data modem means when the paging receiver means has received paging information.

5. The paging receiver system of claim 1 wherein the electronic card device is a Personal Computer Memory Card International Association (PCMCIA) card in which the paging receiver is one function of a plurality of functions performed by the PCMCIA card.

6. A communication device for use in a multi-function electronic card device adapted for insertion into a computing device, the communication device comprising:

(a) data modem means, for communicating modem data between a first computing device and a second computing device over a first communication channel;

(b) transceiver means, operatively coupled to the data modem means, for communicating other information other than modem data over a second communication channel; and (c) switching means, operatively coupled to the data modem means, the transceiver means, and an interface connector on the electronic card device to the first computing device, for selectably providing modem data from the data modem means or other information from the transceiver means to the interface connector based upon control signals between the data modem means and the transceiver means, such that the first computing device requires only a driver interface for the data modem means in order to receive both modem data from the first communication channel and other information from the second communication channel.

7. The communication device of claim 6 wherein the data modem means includes a microprocessor and the switching means is incorporated into a function of the microprocessor in response to a command signal received from the paging receiver means.

8. The communication device of claim 6 wherein the data modem means includes means for communicating facsimile information.

9. The communication device of claim 6 further including means for generating a ring signal by the data modem means when the paging receiver means has received paging information.

10. The communication device of claim 6 wherein the transceiver means is selected from the group consisting of a pager, a celluar digital data packet (CDPD) device, a celluar circuit switch data (CCSD) device, a short message service receiver, a global positioning satellite (GPS) receiver, a data network interface card, a voice signal receiver, and a video signal receiver.

11. The communication device of claim 6 wherein the electronic card device is a Personal Computer Memory Card International Association (PCMCIA) card in which the paging receiver is one function of a plurality of functions performed by the PCMCIA card.

12. A paging receiver system for use in a multi-function electronic card device adapted for insertion into a computing device, the paging receiver system comprising:

(a) paging receiver means on the card device for receiving paging information over a radio frequency communication channel and presenting the paging information to the computing device in a first data format, the first data format being determined by a native paging format of the paging information; and (b) memory means on the card device for receiving the paging information from the computing device in a second data format and storing the paging information in the second data format, the second data format being determined by and compatible with a native file format of an operating system program executing on the computing device.

13. The paging receiver system of claim 12 wherein the electronic card device is a Personal Computer Memory Card International Association (PCMCIA) card in which the paging receiver means is one function of a plurality of functions performed by the PCMCIA card.

14. A paging receiver caddie for receiving an electronic card device, the electronic card device being adapted for insertion into a separate portable computing device, the paging receiver caddie comprising:

a hand-held body of a size slightly larger than the electronic card device and capable of being held in the palm of a single hand, including:

structure defining an aperture into which the electronic card device is inserted;

display means on a surface of the body for displaying paging information; and connector means in the aperture for making electrical connection with the electronic card device when the electronic card device is inserted;

battery means contained within the body and connected to the connector means for providing electrical power to the electronic card device when the electronic card device is inserted; and controller means contained within the body and operably connected to the connector means and the display means for receiving paging information from the electronic card device and for displaying the paging information on the display means, such that paging information from the electronic card device can be accessed when the electronic card device is not inserted into the portable computing device.

\* \* \* \* \*